United States Patent [19]

Tamura et al.

[11] Patent Number: 5,092,628
[45] Date of Patent: Mar. 3, 1992

[54] AIR BAG APPARATUS

[75] Inventors: Keiichi Tamura; Tsutomu Muraoka; Teruhiko Koide, all of Niwa; Sumio Sakaguchi, Nagoya; Hiroaki Shinto, Toyota, all of Japan

[73] Assignees: Kabushiki Kaisha Tokai-Rika-Denki Seisakusho; Toyota Jidosha Kabushiki Kaisha, Japan

[21] Appl. No.: 395,522

[22] Filed: Aug. 18, 1989

[30] Foreign Application Priority Data

| Aug. 23, 1988 | [JP] | Japan | 63-110384 |
| Dec. 2, 1988 | [JP] | Japan | 63-157545 |
| Jan. 13, 1989 | [JP] | Japan | 1-2948 |
| Feb. 9, 1989 | [JP] | Japan | 1-14344 |

[51] Int. Cl.$^5$ ............................................. B60R 21/32
[52] U.S. Cl. .................................... 280/731; 280/734; 73/514
[58] Field of Search ............ 116/203; 200/61.5, 61.44, 200/61.45 R, 61.53; 280/734, 735, 731; 180/282; 73/514; 102/252, 253, 272, 274

[56] References Cited

U.S. PATENT DOCUMENTS

| 3,407,667 | 10/1968 | Doeringsfield | 200/61.45 R |
| 3,601,081 | 8/1971 | Smith | 280/734 |
| 3,749,282 | 7/1973 | Day et al. | 280/734 |
| 3,848,695 | 11/1974 | Lacaze, Jr. | 280/735 |
| 3,916,376 | 10/1975 | Tuttle | 280/735 |
| 4,167,276 | 9/1979 | Bell et al. | 280/731 |
| 4,573,706 | 3/1986 | Breed | 280/734 |
| 4,773,673 | 9/1988 | Sakurai | 280/732 |
| 4,938,504 | 7/1990 | Fukuda | 280/731 |

FOREIGN PATENT DOCUMENTS

| 63-100352 | 6/1988 | Japan . | |
| 63-212150 | 9/1988 | Japan | 280/734 |

Primary Examiner—Charles A. Marmor
Assistant Examiner—Karin Tyson
Attorney, Agent, or Firm—Oliff & Berridge

[57] ABSTRACT

An air bag apparatus is disclosed having a locking device which is adapted to prevent the inflation of a bag accommodated in an air bag body before the air bag body is mounted on a chassis, the bag being adapted to be inflated in front of a seat occupant when a predetermined acceleration has acted on the air bag body. This locking device is arranged such that an actuating member is driven by an operator's operation after mounting the air bag body on the chassis to release the locking device, thereby canceling a locked state and making the air bag body operable.

22 Claims, 20 Drawing Sheets

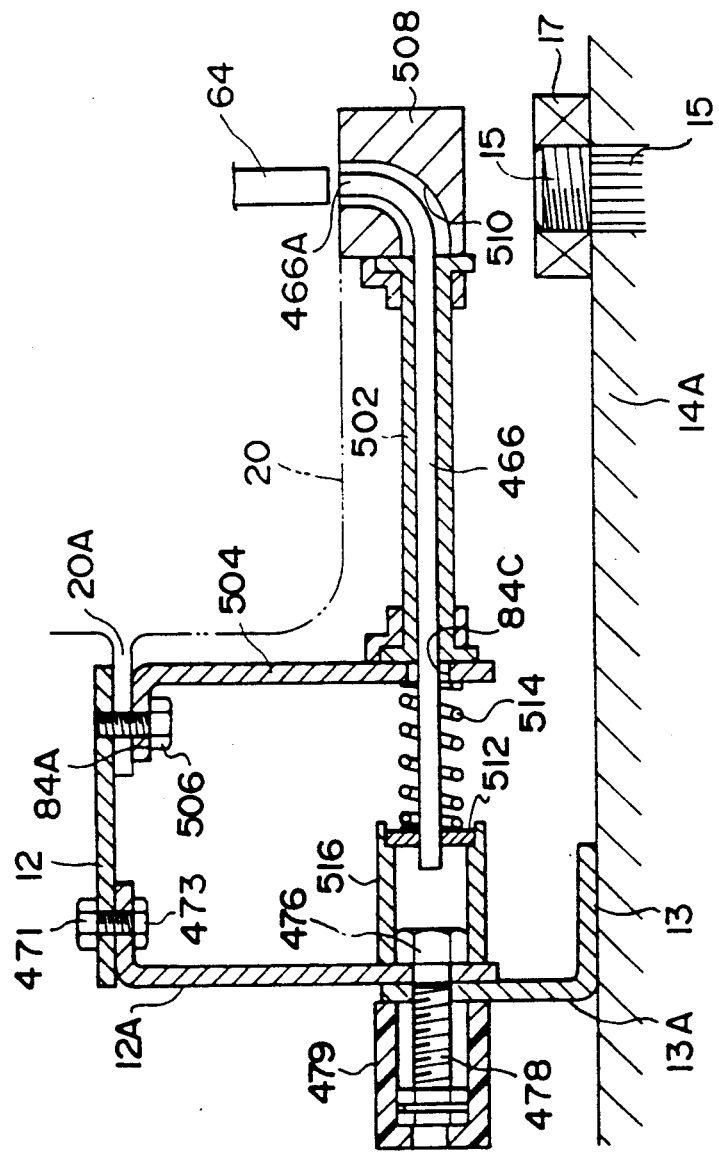

AIR BAG APPARATUS

BACKGROUND OF THE INVENTION

1. Field of the Invention

The present invention relates to an air bag apparatus which protects a seat occupant by inflating a bag when the speed of a vehicle is reduced rapidly.

2. Description of the Related Art

An air apparatus which protects a seat occupant by inflating a bag when the speed of a vehicle is reduced rapidly has been proposed (Japanese Patent Application Laid-Open No. 248455/1985). This type of air bag apparatus is equipped with a lock bar for preventing the movement of a ball, which constitutes an acceleration sensor, so that the bag will not inflate even if an impact is applied to the air bag body before it is mounted on a steering wheel. However, if an attempt is made to mount the air bag body on a steering wheel, a release pin projecting from the steering wheel moves into the air bag body, which in turn causes the lock bar to move, thereby making the ball movable.

Consequently, a conventional air bag apparatus has a drawback in that as the air bag body is mounted on the steering wheel, the acceleration sensor simultaneously becomes operable, so that the acceleration sensor may be actuated by an impact occurring at the time of mounting.

SUMMARY OF THE INVENTION

Accordingly, an object of the present invention is to provide an air bag apparatus which is capable of preventing an actuating member from moving unintentionally at the time of the mounting of an air bag body, thereby overcoming the above-described drawback in the prior art.

To this end, in accordance with the present invention, there is provided an air bag apparatus for inflating a bag accommodated in an air bag body when an acceleration exceeds a predetermined value. The air bag apparatus comprises: locking means for preventing the bag from being inflated when the acceleration exceeds the predetermined value; mounting means for mounting the air bag body on a chassis; and unlocking means which releases the locking means by an operation after the mounting of the air bag body on the chassis by the mounting means and permits the inflation of the bag when the acceleration exceeds the predetermined value whereby the inflation of the air bag is prevented prior to release of the locking means until the mounting of the air bag body on the chassis.

In accordance with the present invention, after the air bag body is mounted on the chassis, an operator manually operates the unlocking means to release the locking means. Accordingly, even if an impact is applied to the air bag body during the operation of mounting the air bag body on the chassis, an acceleration sensor is not actuated, so the air bag body is prevented from becoming operable. Hence, in accordance with the present invention it suffices if the unlocking means is provided such that the unlocking operation is effected by the operator instead of the unlocking means becoming automatically unlocked by the operation of mounting the air bag body on the chassis.

BRIEF DESCRIPTION OF THE DRAWINGS

FIG. 22 is a cross-sectional view illustrating a sixth embodiment and corresponding to FIG. 6.

DESCRIPTION OF THE PREFERRED EMBODIMENTS

A description will now be given of the preferred embodiments of the present invention with reference to the drawings.

FIGS. 1 to 8 illustrate a first embodiment of an air bag apparatus to which the present invention is applied.

Figure 7:
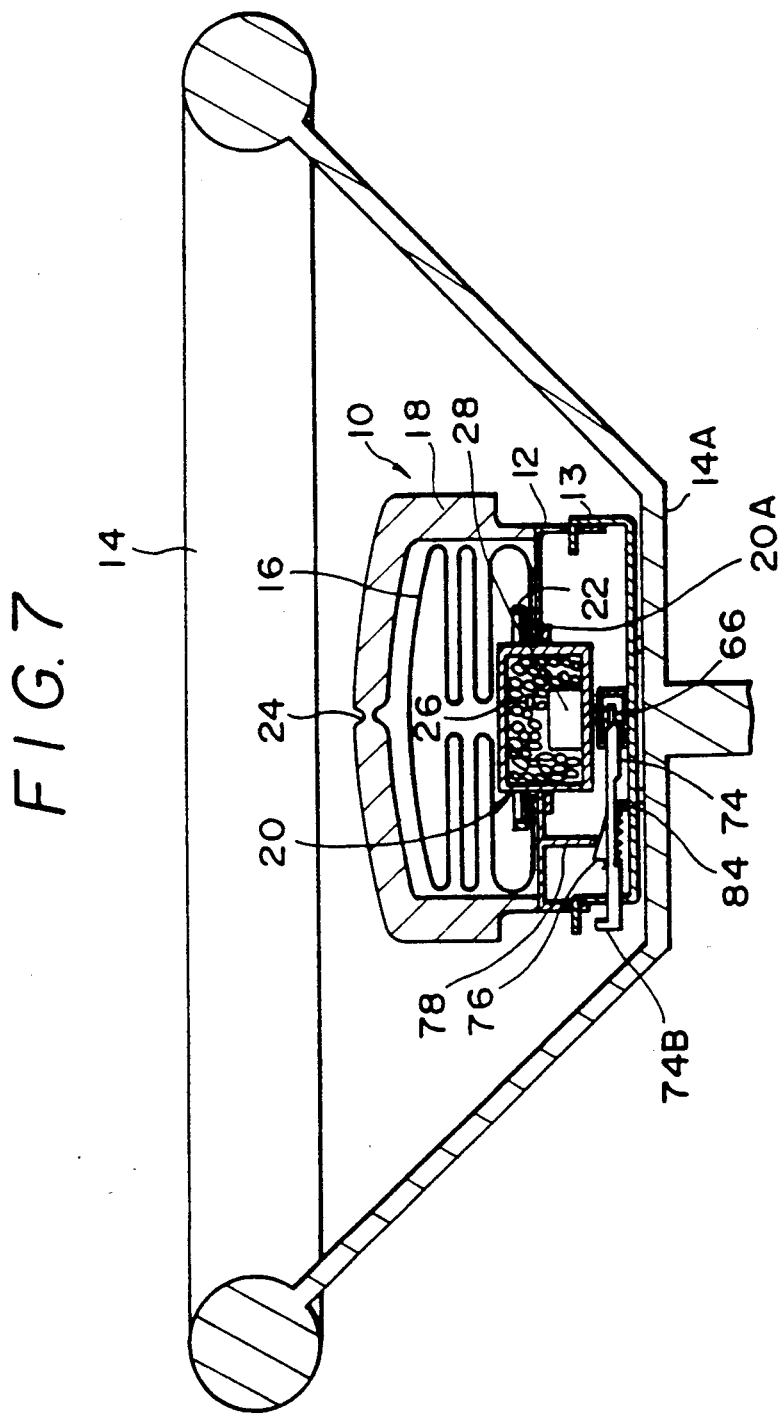
FIG. 7 is a cross-sectional view taken along the steering shaft, illustrating the whale construction of the first embodiment.
Figure 8:
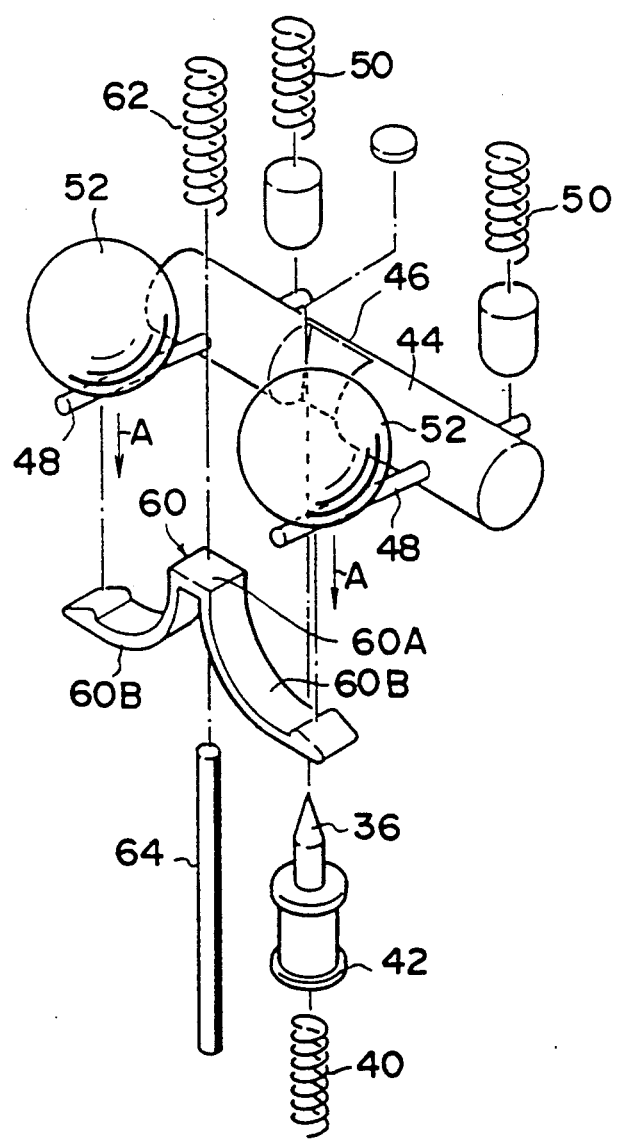
FIG. 8 is an exploded perspective view illustrating a principal part of the trigger.

As shown in FIG. 7, an air bag body 10 has a baseplate 12 secured to a hub 14A of a steering wheel 14 by means of a support plate 13 that is substantially in parallel therewith. A bag 16, a cover 18, and an inflator 20 are mounted on the baseplate 12.

The bag 16 is disposed on the baseplate 12 which is closer to the seat occupant (on the upper side as viewed in FIG. 7) in a folded state. An edge of the bag 16 on the opening side thereof is fixed to a substantially central portion of the baseplate 12 by a ring plate 22. The ring plate 22 is tightened to the baseplate 12 by means of unillustrated bolts or rivets, whereby the edge of the bag 16 on the opening side thereof is pressed against the baseplate 12.

Figure 1:
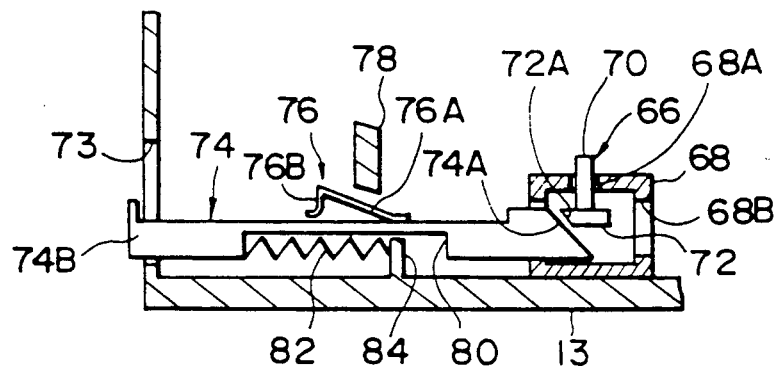
FIG. 1 is a cross-sectional view taken long the longitudinal axis of a steering shaft, illustrating a principal part of an air bag in accordance with a first embodiment of the present invention.

The cover 18 is disposed on the side of the baseplate 12 closer to the seat occupant (on the upper side as viewed in FIG. 1). The bag 16 is accommodated in a space formed between the cover 18 and the baseplate 12. The cover 18 has an unillustrated frame like core buried in a peripheral portion thereof. The core is fixed to the baseplate 12 by rivets or the like. A thin portion 24 is formed in the cover 18 opposed to the base plate 12, so that the portion is easily broken.

The inflator 20 is cylindrically shaped, and is disposed in such a manner as to pass through a substantially central portion of the baseplate 12 and is inserted into the bag 16. A flange 20A is formed in an outer periphery of the inflator 20, and is secured to the side of the baseplate 12 away from the seat occupant (on the lower side as viewed in FIG. 7) by means of unillustrated bolts.

As shown in FIG. 7, the inflator 20 has a gas-producing substance sealed therein and incorporates a trigger 28 for burning the gas-producing substance.

The gas-producing substance 26 is decomposed on being burnt and discharges a large amount of gas so that the bag 16 is inflated by the gas. As the gas-producing substance 26, there is one which contains, for instance, sodium azide. Disposed inside the gas-producing substance 26 are the trigger 28 and a detonator 30 (shown in FIG. 5). The arrangement is such that when the detonator 30 is exploded, an unillustrated igniter is ignited to burn the gas-producing substance 26.

Figure 5:
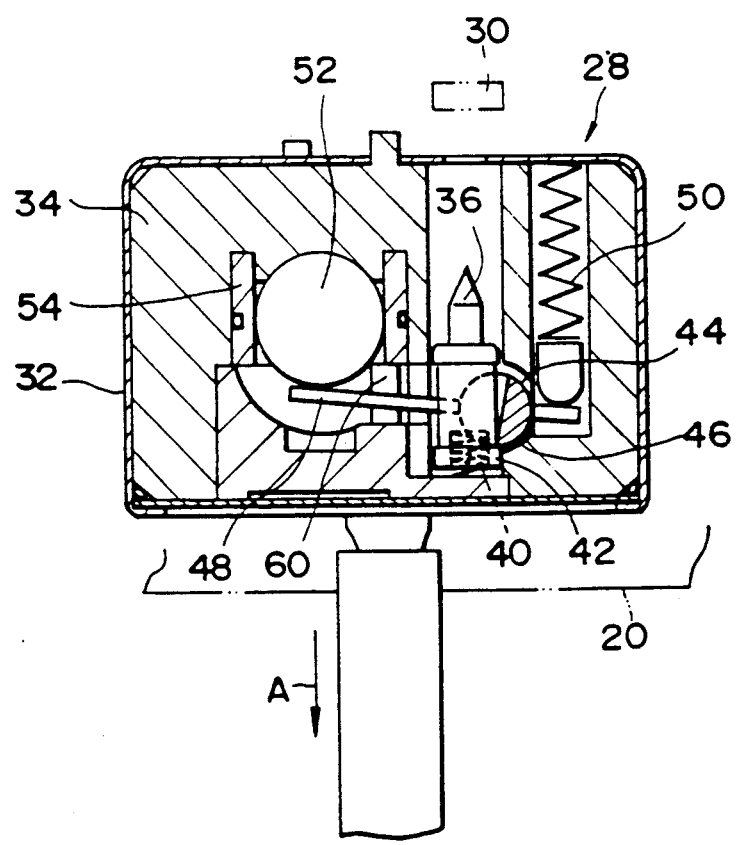
FIG. 5 is a cross-sectional view taken along the line V—V of FIG. 4.

As shown in FIG. 5, the trigger 28 is arranged such that a block 34 is secured inside a housing 32, and an ignition pin 36 is supported by the block 34.

The ignition pin 36 is supported in such a manner as to be movable in the axial direction vertically as viewed in FIG. 5. As it moves axially, its tip penetrates the housing 32 and collides against the detonator 30, thereby permitting the detonator 30 to explode. The ignition pin 36 is urged toward the detonator 30 by a compression coil spring 40, but the ignition pin 36 is held in a state of noncontact with the detonator 30 opposite to the urging force of the compression coil spring 40 because a collar 42 which is provided on the ignition pin 36 retains a drive shaft 44.

The drive shaft 44 is disposed substantially perpendicular to the ignition pin 36 and has an intermediate portion thereof notched into a substantially semicircular section. A circular portion 46 is retained by the collar 42 of the ignition pin 36. The drive shaft 44 is pivotally supported by the block 34 in such a manner as to be rotatable. The circular arc portion 46 disengages from the collar of the ignition pin 36 upon rotation of the drive shaft 44, allowing the ignition pin 36 to collide against the detonator 30 by the urging force of the compression coil spring 40.

The drive shaft 44 has a pair of levers 48 (see FIG. 8) secured through to an intermediate portion thereof, and is adapted to rotate as the levers 48 swing.

Figure 3:
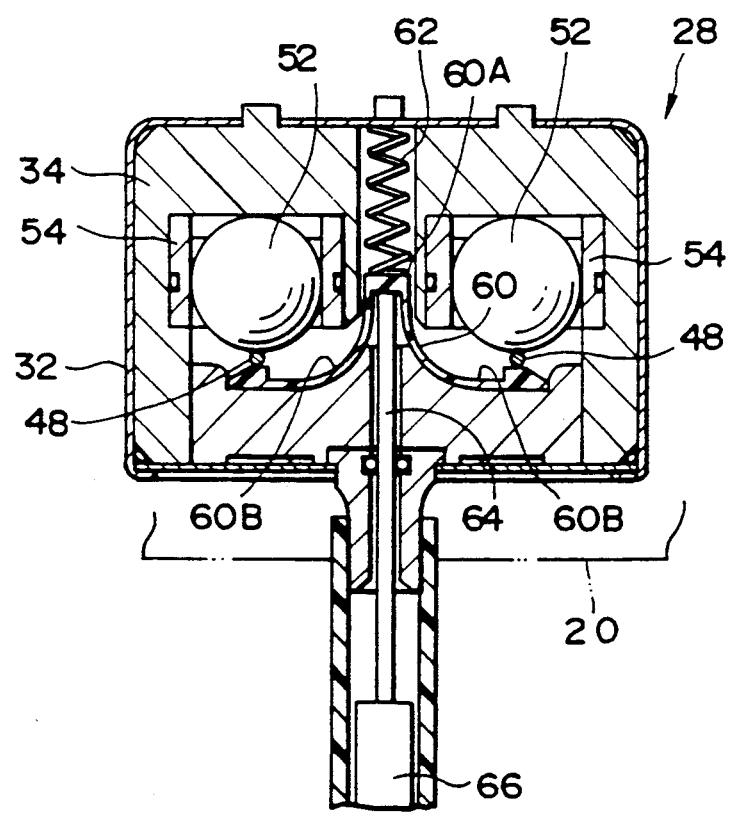
FIG. 3 is a cross-sectional view illustrating a trigger in accordance with the first embodiment.

The levers 48 are disposed substantially perpendicularly to the drive shaft 44 (see FIG. 3, 8). Each of the two levers 48 has one end connected to a compression coil spring 50 and the other end connected to a ball 52. In other words, each one pair of the compression coil springs 50 and the balls 52 is provided so as to correspond to the pair of levers 48.

Each compression coil spring 50 is adapted to urge the rotation of the drive shaft 44 by the levers 48. By virtue of this urging force, the circular arc portion 46 of the drive shaft 44 is prevented from being unintentionally disengaged from the collar 42 of the ignition pin 36 unless a predetermined acceleration acts on the balls 52.

Each ball 52 which is used as an acceleration or deceleration sensing device and is supported by block 34, is accommodated in a cylinders 54, and is adapted to move in the direction of an arrow A in FIG. 5 while swinging the lever 48 by means of inertia against the urging force of the compression coil spring 50 when the speed of the vehicle is decreased rapidly. The swinging of the lever 48 at this time causes the drive shaft 44 to rotate, which in turn causes the circular portion 46 of the drive shaft to disengage from the collar portion 42 of the ignition pin 36.

Figure 4:
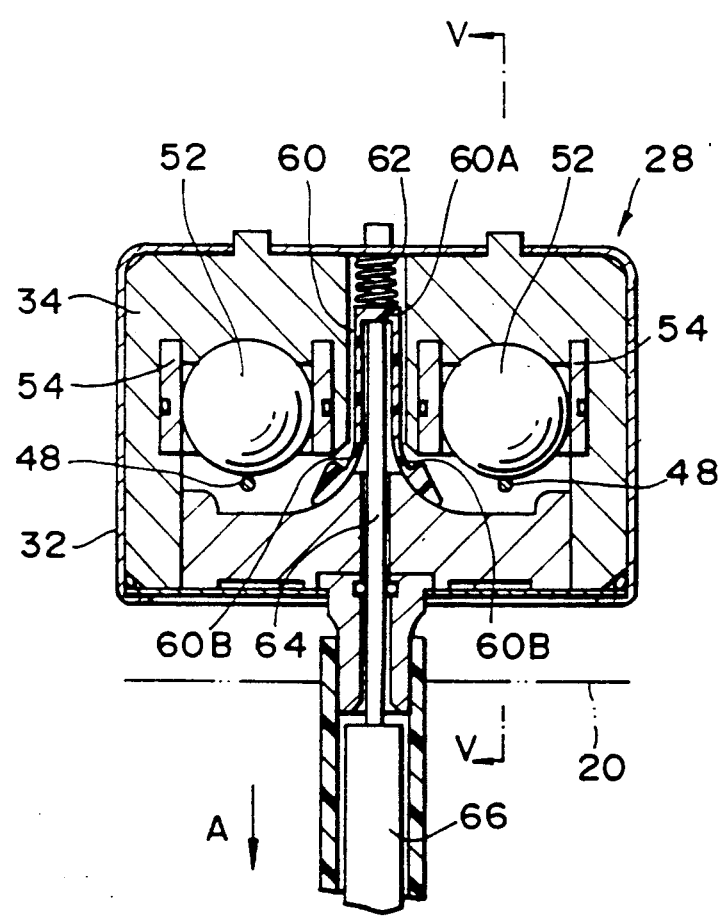
FIG. 4 is a diagram illustrating the state of operation of the trigger shown in FIG. 3.

Around levers 48, as also shown in FIGS. 3 and 4, a lock bar 60 is supported by the block 34 in such a manner as to be movable in the axial direction (vertically as viewed in FIGS. 3 and 4). The lock bar 60 has a pair of flexible pieces 60B branching off from a base portion 60A. As the lock bar 60 moves in the axial direction (vertically as viewed in FIGS. 3 and 4, the flexible pieces 60B are capable of moving toward or away from the paths of swinging movement of the levers 48, respectively. Accordingly, the flexible pieces 60B constitute a major portion of a locking means which prevents the levers 48 from swinging as the flexible pieces 60B move into the paths of swinging movement of the levers 48.

The lock bar 60 is urged by a compression coil spring 62 in a direction in which the flexible pieces 60B move into the paths of the swinging movement of the levers 48 (downwardly as viewed in FIGS. 3 and 4).

A lock shaft 64 is supported by the block 34 in such a manner as to be movable in the axial direction (vertically as viewed in FIGS. 3 and 4). The arrangement is such that the upward movement (as viewed in FIGS. 3 and 4) of the lock shaft 64 presses the lock bar 60 so as to cause the flexible pieces 60B of the lock bar 60 to move out of the paths of swinging movement of the levers 48. In addition, the urging force of the compression coil spring 62 moves the lock bar 60 so as to cause the flexible pieces 60B of the lock bar 60 to move into the paths of swinging movement of the levers 48.

Figure 2:
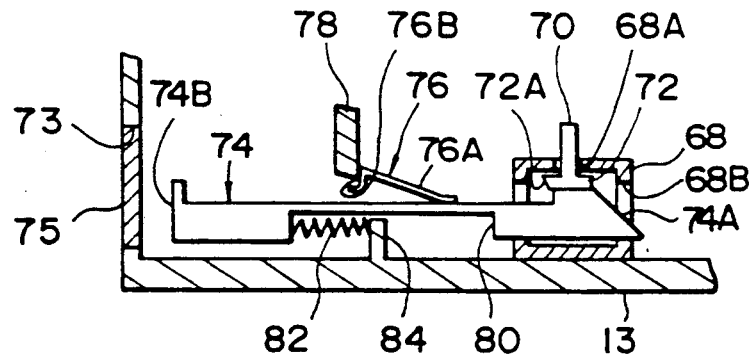
FIG. 2 is a diagram illustrating the state of operation of the principal part shown in FIG. 1.

A distal end of a release pin 66 is adapted to abut against an end of the lock shaft 64 opposite to the end facing the lock bar 60. As shown in FIG. 1 and 2, the release pin 66 is supported by a holder 68 provided uprightly on the support plate 13, in such a manner as to be vertically movable as viewed in FIGS. 1 and 2. This release pin 66 comprises a projection 70 and a flange 72. The projection 70 is inserted in a bore 68A formed in the holder 68 and is adapted to press the lock shaft 64. In addition, a tapered portion 72A is formed on the flange 72.

An inclined distal end portion 74A of a slide member 74, which is an actuating member or unlocking means and is inserted radially of the steering wheel into the support plate 13 through an opening 73 formed in the support plate 13, is oppositely disposed to face the tapered portion 72A of the flange 72. The arrangement is such that when the slide member 74 is pushed rightwardly as viewed in FIG. 1 with the distal end 74A entering an opening 68B of the holder 68, the release pin 66 is subjected to an upwardly pushing force by the distal end 74A of the slide member 74. A cover 75 is detachably provided in the opening 73 of the support plate 13 (see FIG. 2). The cover 75 is fitted into the opening 73 when a rear end 74B of the slide member 74 is accommodated inside the support plate 13.

A bent cantilevered stopper 76 having an inclined portion 76A and a vertically rising portion 76B is provided on the upper surface of the slide member 74 in the projecting manner. This stopper 76 is formed of a flexible member such as a leaf spring. The arrangement of the stopper 76 is such that when it moves rightwardly as viewed in FIG. 1 through a gap formed between the slide member 74 and a fixing plate 78 projecting from the baseplate 12, the inclined portion 76A is subjected to elastic deformation and approaches the upper surface of the slide member 74. When the vertically rising portion 76B has passed through the gap between the fixing plate 78 and the slide member 74, the vertically rising portion 76B is engaged with the fixing plate 78 so as to prevent the backward return of the slide member 74.

In addition, a notch 80 is formed longitudinally in a lower portion of the slide member 74. A compression coil spring 82 and a projection 84 projecting from the support plate 13 are inserted in the notch 80.

A description will now be given of the operation of this embodiment.

When the air bag body 10 is mounted on the steering wheel 14, the mounting is effected after positioning the air bag body 10 on the steering wheel 14 as in the conventional manner. In this case, as shown in FIG. 1, the distal end 74A of the slide member 74 is not brought into contact with the flange 72 of the release pin 66. Hence, since the distal end of the projection 70 of the release pin 66 is not brought into contact with the lower end of the lock shaft 64, the lock shaft 64 does not move in the direction of the arrow A in FIG. 6. In consequence, since neither the lock lever 60 moves in the direction of the arrow A in FIG. 6, the movement of the levers 48 and the balls 52 is prevented by the flexible pieces 60B of the lock lever 60.

Figure 6:
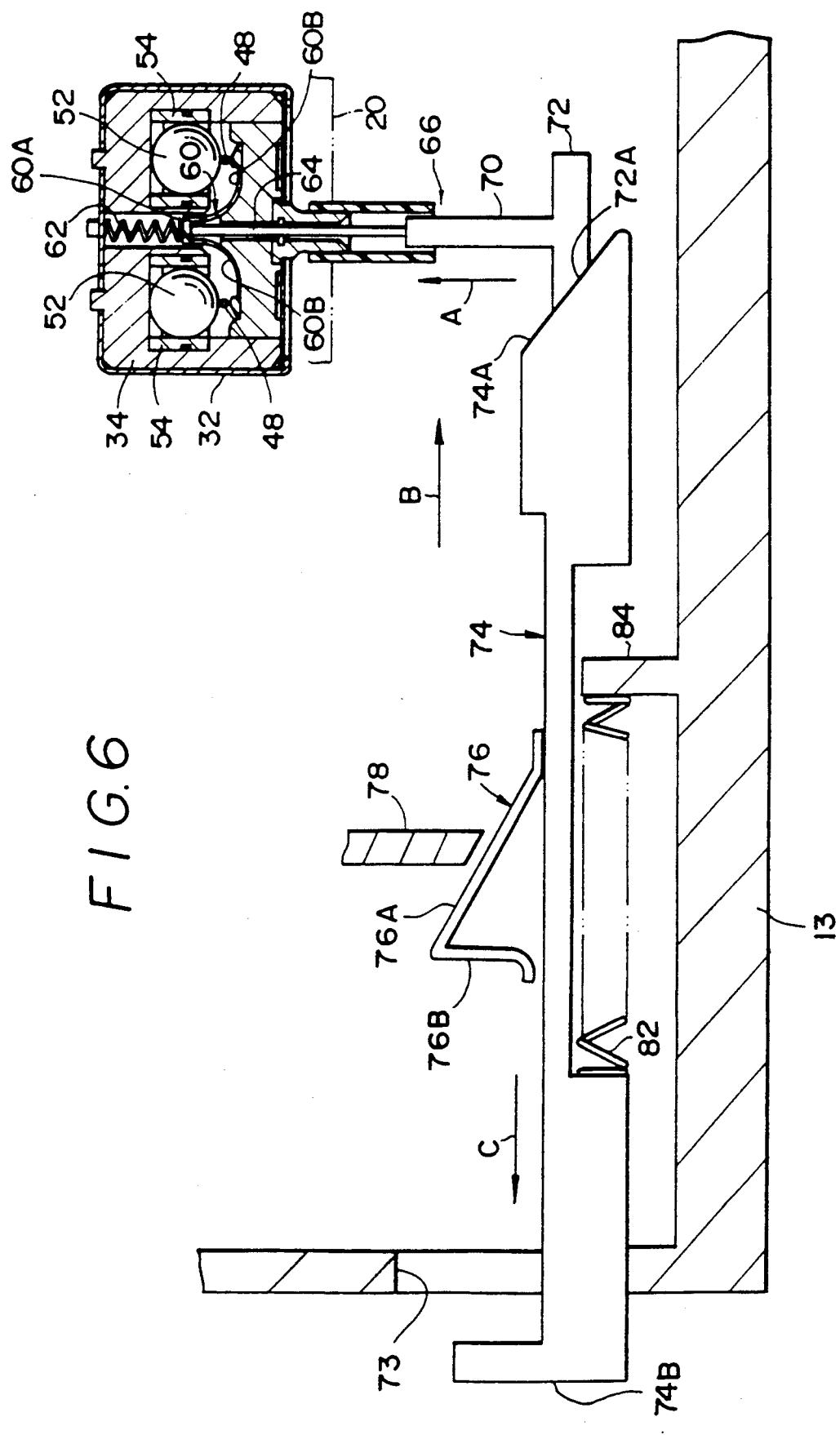
FIG. 6 is a partially enlarged view of FIG. 7.

When the operation of mounting the air bag body 10 on the steering wheel 14 by means of unillustrated bolts or the like is completed, the slide member 74 is pressed in the longitudinal direction, i.e., in the direction of an arrow B in FIG. 6. Then, the slide body 74 moves in the direction of the arrow B against the urging force of the compression coil spring 82. In this case, the inclined portion 76A of the stopper 76 is brought into contact with the fixing plate 78, but since the stopper 76 is formed of a flexible member, the stopper 76 passes below the fixing plate 78 while the inclined portion 76A slides below the lower end surface of the fixing plate 78. When the stopper 76 has passed below the fixing plate 78, the stopper 76 resumes its original configuration and, at the same time, the vertically rising portion 76B of the stopper 76 is retained by the fixing plate 78. For this reason, the stopper 76 is engaged with the fixing plate 78, thereby preventing the slide member 74 from moving in the direction of any arrow C in FIG. 6.

In addition, since the distal end 74A of the slide member 74 is brought into contact with the tapered portion 72A of the flange 72 of the release pin 66, the release pin 66 moves in the axial direction of the steering wheel (in the direction of the arrow A), and the projection 70 of the release pin 66 moves the lock shaft 64 upwardly. In conjunction with the movement of the lock shaft 64, the lock bar 60 moves against the urging force of the compression coil spring 62.

As a result, as shown in FIG. 4, the flexible pieces 60B of the lock bar 60 move out of the paths of movement of the levers 48, thereby allowing the levers 48 and the balls 52 to move.

In addition, since, in this state, the slide member 74 is accommodated in the support plate 13, as shown in FIG. 2, the cover 75 can be fitted in the opening 73 of the support plate 13, so that the outward appearance is prevented from becoming unattractive.

Furthermore, when the rear end portion 74B of the slide member 74 projects outwardly from the opening 73 of the support plate 13, it is the state in which the movement of the levers 48 and the balls 52 is locked by the lock lever 60. When the rear end portion 74B of the slide member 74 is accommodated inside the support plate 13, it is the state in which the levers 48 and the balls 52 are not locked by the lock lever 60. Thus, it is possible to readily ascertain the locked state by simply looking at the position of the slide member 74, particularly the rear end portion 74B thereof.

FIGS. 9 to 12 illustrate a second embodiment of the present invention.

In this embodiment, a release pin 266 for pressing the lock shaft 64 is adapted to be guided by the block 34 and a pin insertion hole 258 formed in a projection 256 projecting from the inflator 20. In addition, a holder insertion recess 257 in which a holder 268 is inserted is formed in the projection 256 coaxially with the pin insertion hole 258.

Figure 9:
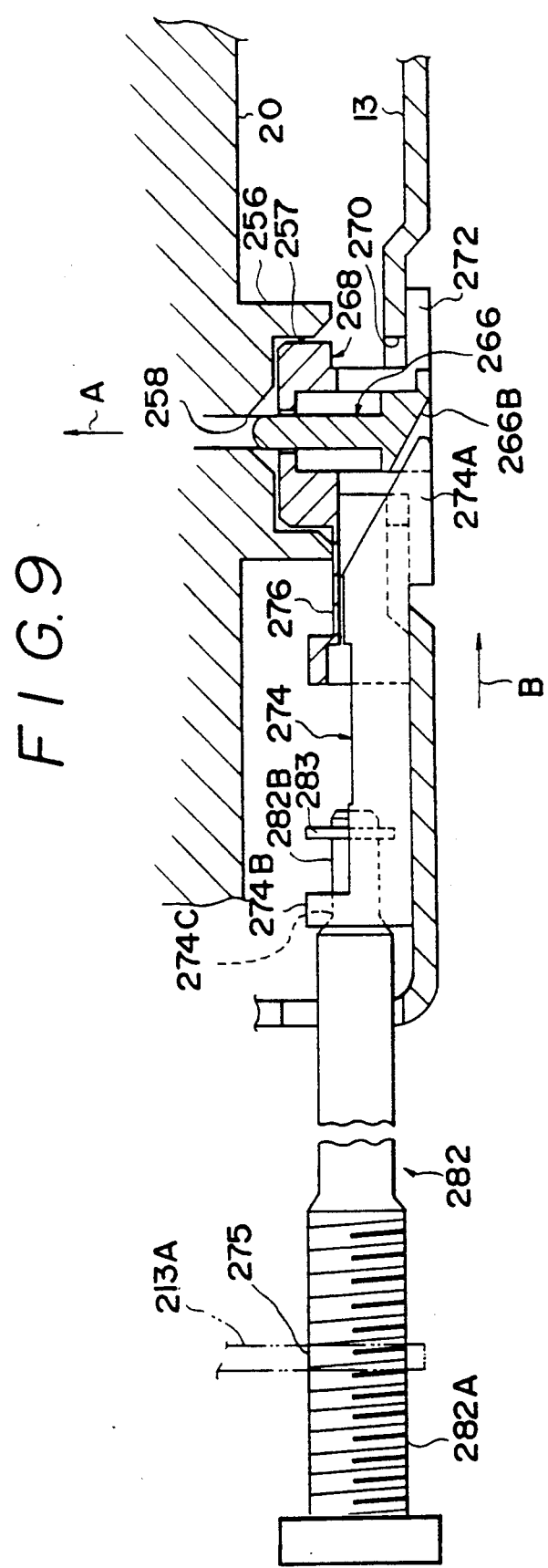
FIG. 9 is an enlarged view illustrating a second embodiment and corresponding to FIG. 6.
Figure 10:
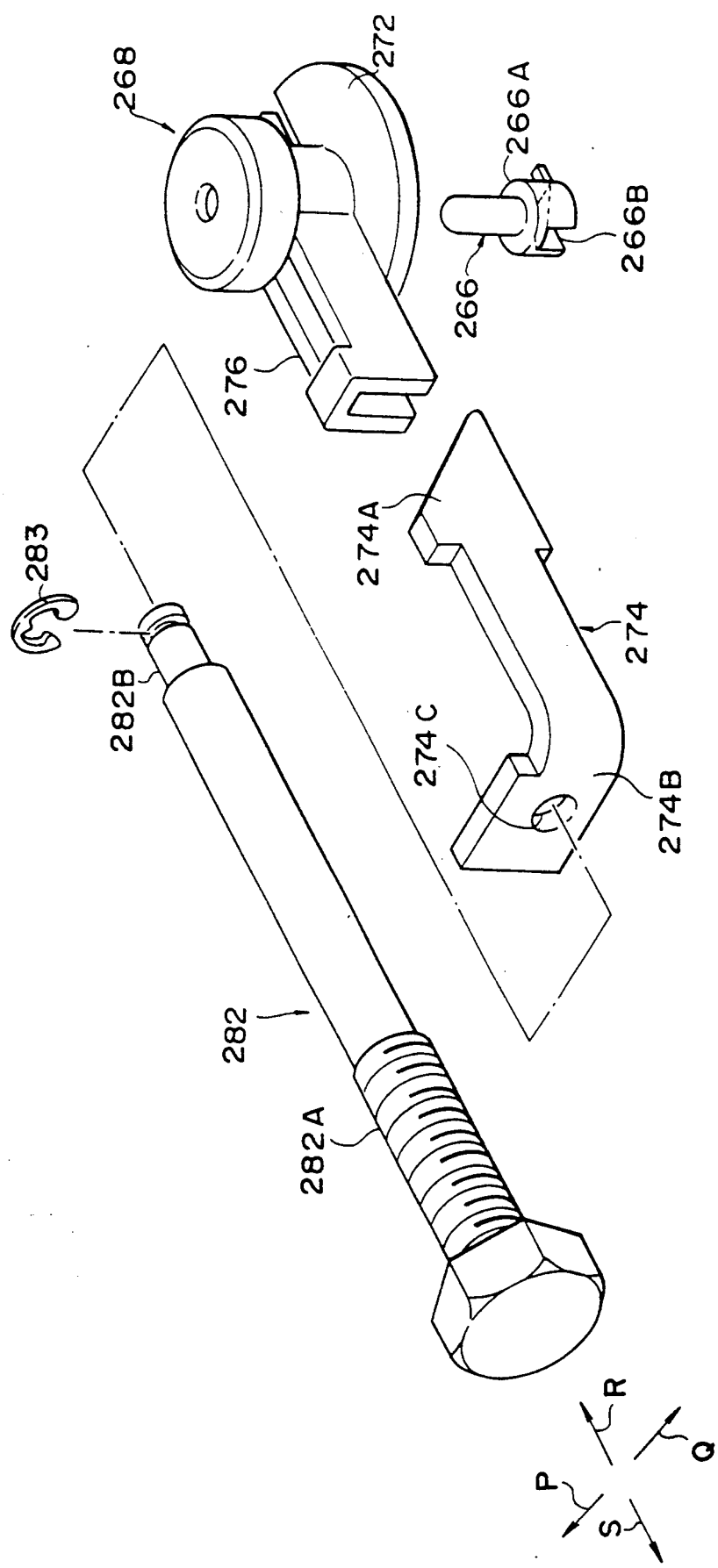
FIG. 10 is an exploded perspective view of FIG. 9.

As shown in FIG. 9, the release pin 266 is held vertically and is movable inside the holder 268 supported by the support plate 13. This holder 268 is inserted through an opening 270 formed in the support plate 13 and a flange 272 thereof is provided in such a manner as to be movable perpendicularly to the axial direction of the holder 268 below the support plate 13. As shown in FIG. 10, a guide portion 276 is formed on the holder 268 so that a slide body or unlocking means 274 for vertically moving the release pin 266 inside the holder 268 can be easily inserted. In addition, a groove 266B having a rectangular cross-sectional configuration is formed radially in a base portion 266A of the release pin 266, and a distal end 274A of the slider member 274 is adapted to be inserted therein. The rectangular groove 266B is formed in a tapered manner such that one end thereof connected to the outer periphery of the base portion 266A is the deepest, and gradually tapering off toward the other end.

As shown in FIG. 9, a threaded hole 275 is formed in a tongue 213A extending from an end of the support plate 13. A threaded portion 282A of an elongated pin 282 is threadingly engaged with the threaded hole 275 for allowing the slide member 274 to slide.

In addition, as shown in FIG. 10, a distal end portion 282B of the elongated pin 282 is inserted loosely into a circular hole 274C formed in a rear end portion 274B of the slide body 274, and is then fixed to the slide member 274 by means of a stopper plate 283 secured to the distal end portion 282B of the elongated pin 282. Accordingly, since the elongated pin 282 is fixed to the slide member 274 with play, the elongated pin 282 is capable of moving by a small amount in the radial and axial directions of the elongated pin 282 (in the directions of arrows P, Q, R and S in FIG. 10) relative to the slide member 274.

The operation of the second embodiment will be described hereinunder.

When mounting the air bag body 10 onto the steering wheel 14, the operator holds the air bag body 10, and brings the holder insertion recess 257 of the projection 256 of the inflator 20 toward the holder 268 supporting the release pin 266. Then, when the holder inserting recess 257 is made to correspond to the holder 268, the inflator 20 is pressed against the steering wheel 14. In this case, even if the holder insertion recess 257 and the holder 268 are not completely aligned with each other, the holder 268 is movable in a direction perpendicular to its axis (in the horizontal direction in FIG. 9) to insert into the holder insertion recess 257. Therefore, if only a part of the holder 268 is received in the holder inserting recess 257, the holder 268 moves in conformity with the holder insertion recess 257, so that the holder 268 can be inserted readily into the holder insertion recess 257. Preferably, a large chamber 257A may be formed at an entrance portion of the holder insertion recess 257 to facilitate the entrance of the holder 268.

In this state, as shown in FIG. 9, since the slide member 274 has not pushed up the release pin 266, the inflator 20 is in a locked state, so that the balls 52 do not move even if an impact is applied thereto.

Upon completing the operation of mounting the air bag apparatus body 10 on the steering wheel 14, the slide member 274 is pressed in the direction of the arrow B in FIG. 9 by screwing in the elongated pin 282, thereby moving the slide member 274 in the direction of the arrow B.

Figure 11:
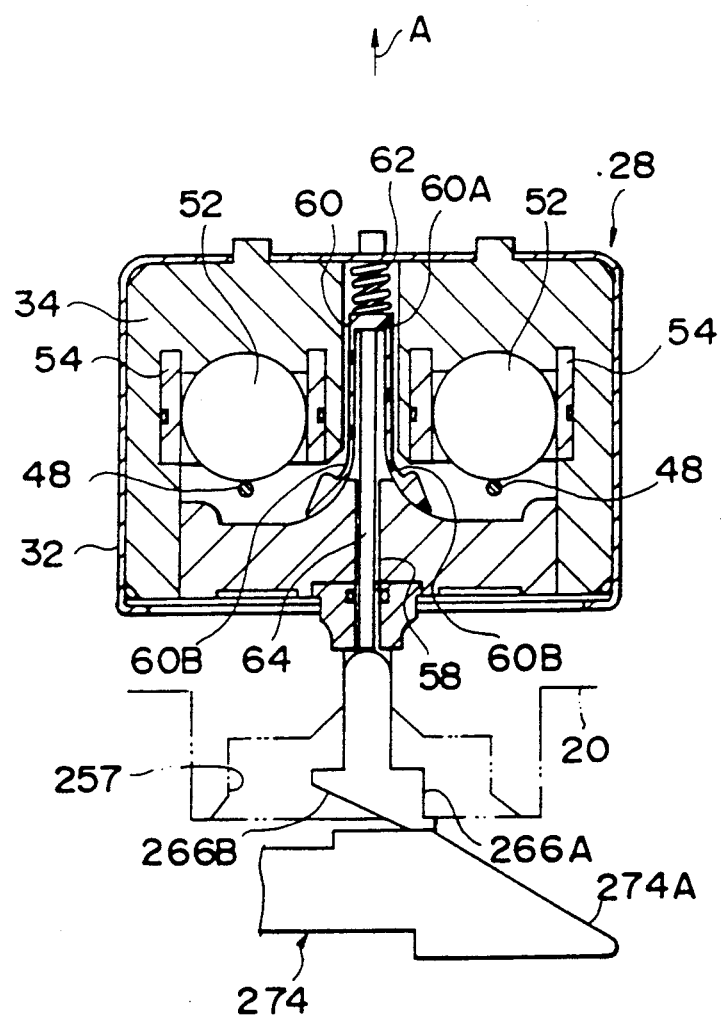
FIG. 11 is a cross-sectional view and corresponds to FIG. 4.
Figure 12:
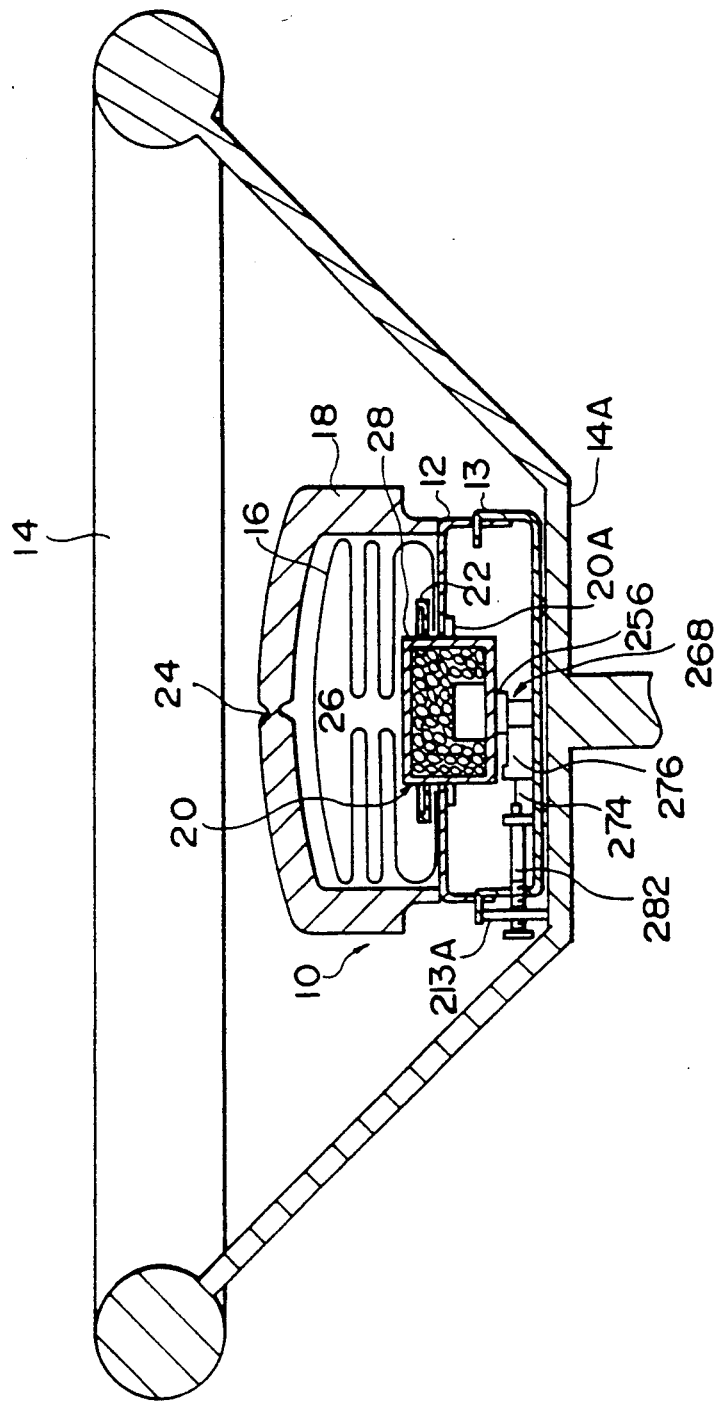
FIG. 12 is a cross-sectional view illustrating the whole construction of the second embodiment and corresponding to FIG 7.

Then, as shown in FIG. 11, the distal end portion 274A of the slide member 274 is inserted into the rectangular groove 266B of the base portion 266A of the release pin 266, which in turn causes the release pin 266 to move in the direction of the arrow A by being pushed upward by the slide member 274. As a result, the lock shaft 64 is moved, so that the lock bar 60 moves against the urging force of the compression coil spring 62.

Consequently, the flexible pieces 60B of the lock bar 60 move out of the paths of movement of the levers 48, with the result that the levers 48 and the balls 52 become movable.

The demounting of the air bag apparatus 10 is effected in the reverse order of the above-described one. Specifically, since the body 10 is removed from the steering wheel 14 after the elongated pin 282 is rotated in the reverse direction to cause flexible pieces 60B of the lock bar 60 to move into the paths of movement of the levers 48, the inflator 20 is prevented from being triggered due to an impact occurring during demounting.

Figure 13:
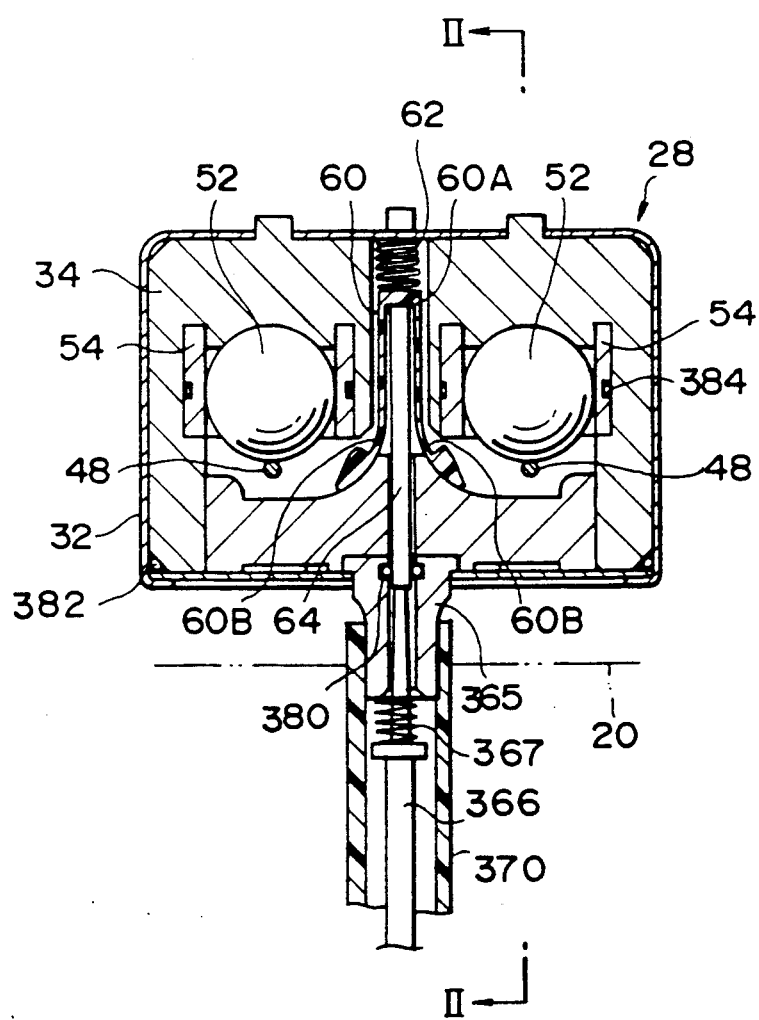
FIG. 13 is a cross-sectional view illustrating a third embodiment and corresponding to FIG. 11.
Figure 14:
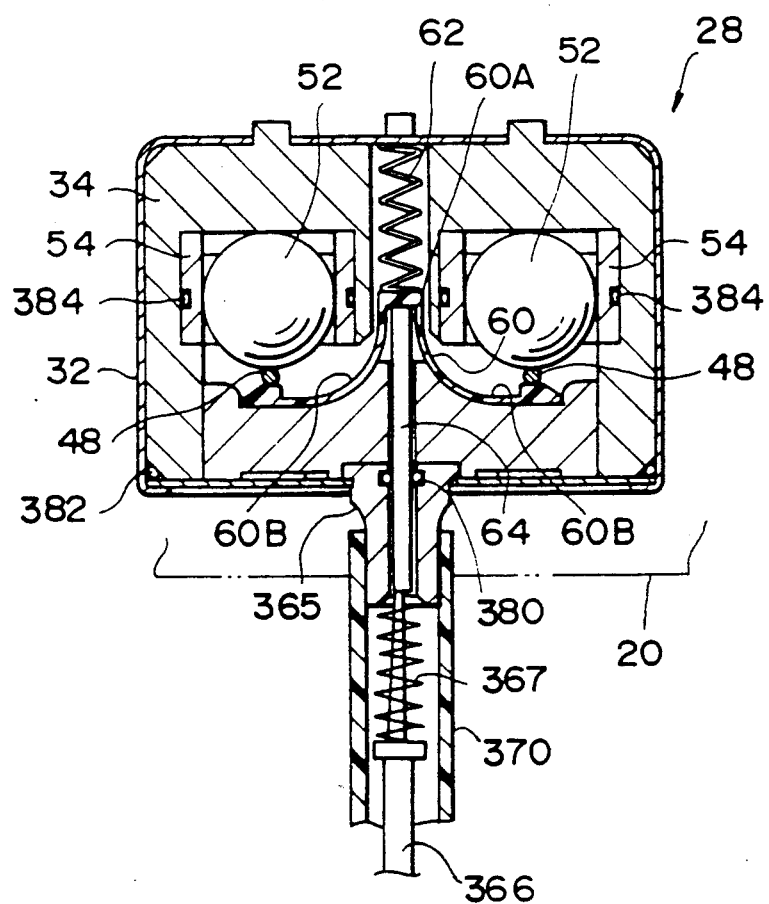
FIG. 14 is a diagram illustrating the state of operation of a trigger device shown in FIG. 13.
Figure 15:
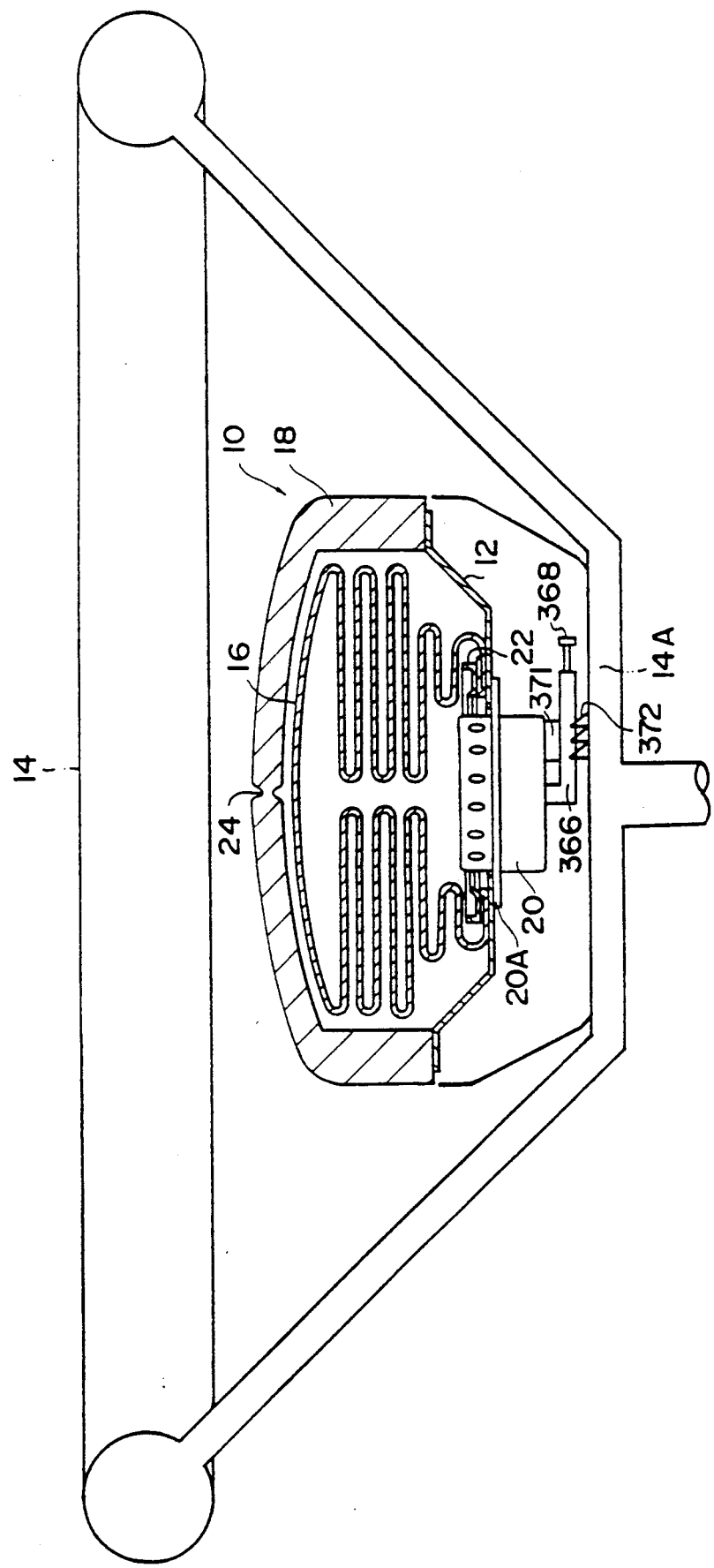
FIG. 15 is a cross-sectional view illustrating the whole construction of the third embodiment and corresponding to FIG. 7.

Referring now to FIGS. 13 to 15, a description will be given of a third embodiment of the present invention.

In this embodiment, a wire 366 is used as an actuating member or unlocking means. This wire 366 is accommodated tightly in a tube 370 so as to be capable of imparting compressive and tensile forces. The tube 370 has one end connected to a coupling 365 to cause one end of the wire 366 to abut coaxially against the lock shaft 64. In addition, intermediate portions of the tube 370 and the wire 366 are bent substantially orthogonally, and, as shown in FIG. 15, the other ends are led radially away from the axis of the steering wheel 14. The other ends of the tube 370 and the wire 366 may be bent tangentially after being led radially. Furthermore, the tube 370 thus led radially is clamped and secured between the steering hub 14A and a block 371 secured to the bottom of the inflator 20. A distal end of the wire 366 projecting from the tube 370 constitutes an inputting portion 368 for inputting an operating force by the operator. Triangular pawls 372 project from the hub 14A and bite into the tube 370. Consequently, the arrangement is such that although the wire 366 can be moved in the direction for cancelling the lock of the trigger 28 by a pressing force applied to the operating force inputting portion 368, but the wire 366 cannot move backward. However, in the state in which the air bag body 10 is removed from the hub 14A, the block 371 moves away from the pawls 372, the pawls 372 do not restrict the movement of the wire 366.

As shown in FIGS. 13 and 14, a compression coil spring 367 is interposed between the wire 366 and the coupling 365 so as to urge the wire 366 in the direction away from the lock shaft 64. In the drawings, reference numerals 380, 382 and 384 denote O-rings.

Accordingly, in this embodiment, the state shown in FIG. 14 is also maintained prior to the mounting of the air bag body 10 on the steering wheel 14. In other words, the lock shaft 64 and the wire 366 are urged downward as viewed in FIG. 14 by the urging forces of the compression coil springs 62, 367. The flexible pieces 60B are located in the paths of movement of the levers 48, thereby assuming a locked state. For this reason, the balls 52 are prevented from moving even if an impact is applied thereto when the air bag body 10 is mounted on the steering wheel 14.

When the air bag body 10 is secured to the steering wheel 14, the tube 370, as shown in FIG. 15, is simultaneously clamped by the block 371 and the pawls 372. The pawls 372 bite into the wire 366 through the tube 370.

Since the wire 366 is capable of being pressed into the tube 370, when the operator pushes the operating force inputting portion 368 into the tube 370, the wire 366, together with the lock shaft 64, rises against the urging forces of the compression coil spring 62, 367, and the state shown in FIG. 14 turns into the state shown in FIG. 13, so that the flexible pieces 60B move out of the paths of movement of the levers 48. Accordingly, the locked state is canceled, so that the balls 52 become operable.

In addition, when demounting the air bag body 10, if the air bag body 10 is removed from the steering wheel 14, the pawls 372 are moved away from the wire 366, so that the wire 366 can be withdrawn.

Figure 16:
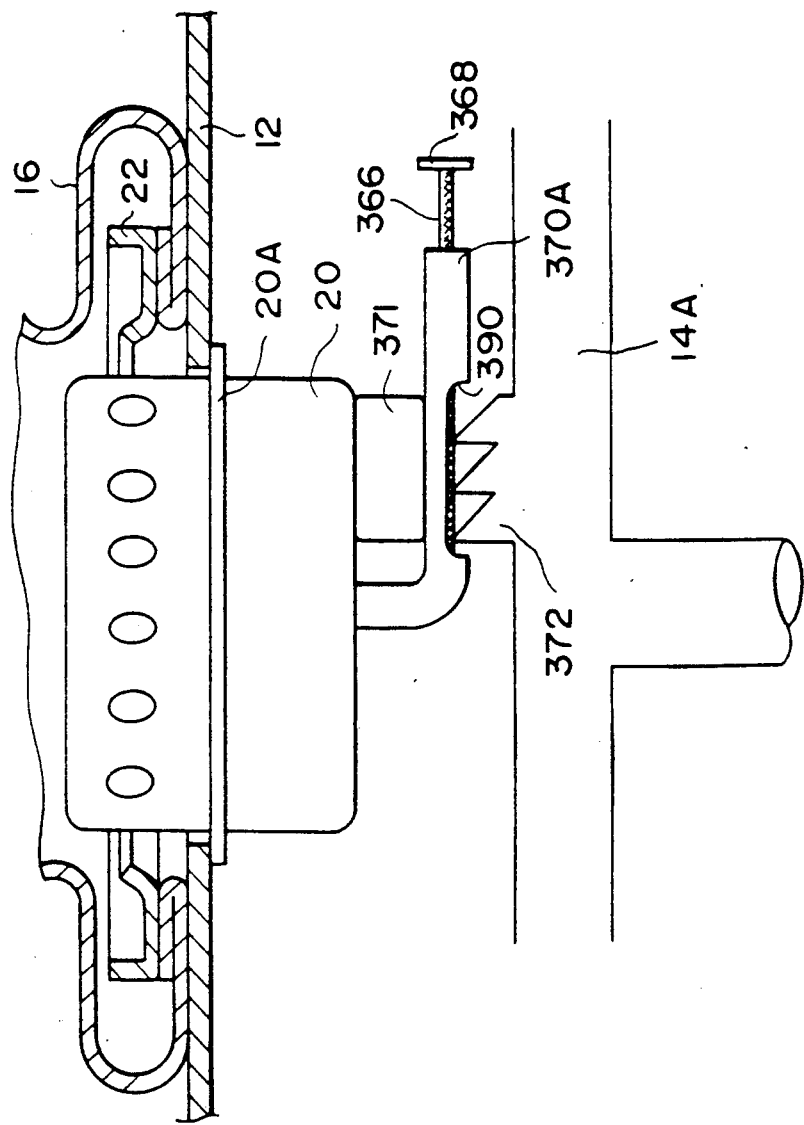
FIG. 16 is an enlarged view illustrating a fourth embodiment and corresponding to FIG. 15.

FIG. 16 illustrates a fourth embodiment of the present invention. In this embodiment, a notch 390 is formed in a portion of th tube 370. By virtue of this arrangement, when the air bag body 10 is mounted on the steering wheel 14, the pawls 372 are brought into direct contact with the wire 366 so as to restrict the movement of the wire in the direction of being withdrawn.

It should be noted that, instead of the pawls 372 in the above-described embodiments, an arrangement may be alternatively provided such that an outer peripheral portion of the wire 366 is formed into triangular projections in the same way as the pawls 372 so that the wire in a state of engagement with the steering hub 14A is movable only in one direction.

FIGS. 17 to 21 illustrate a fifth embodiment of the present invention. In this embodiment, the steering hub 14A is provided with a recess 14B, and a nut 17, threadingly engaged with the distal end of the steering shaft 15 that is splined to the hub 14A, is received in the recess 14B.

In this embodiment as well, a wire or unlocking means 466 is used for transmitting the operator's operating force for unlocking This wire 466 is adapted to be guided to a support base 468 fixed to the hub 14A by means of a bolt 467.

Figure 20:
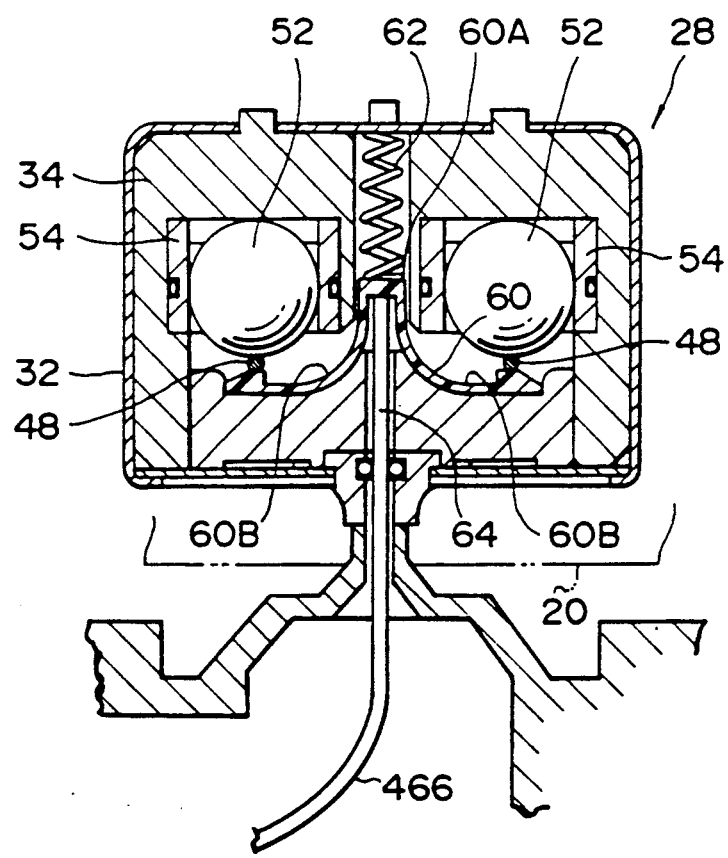
FIG. 20 is a cross-sectional view of the fifth embodiment and corresponding to FIG. 3.
Figure 21:
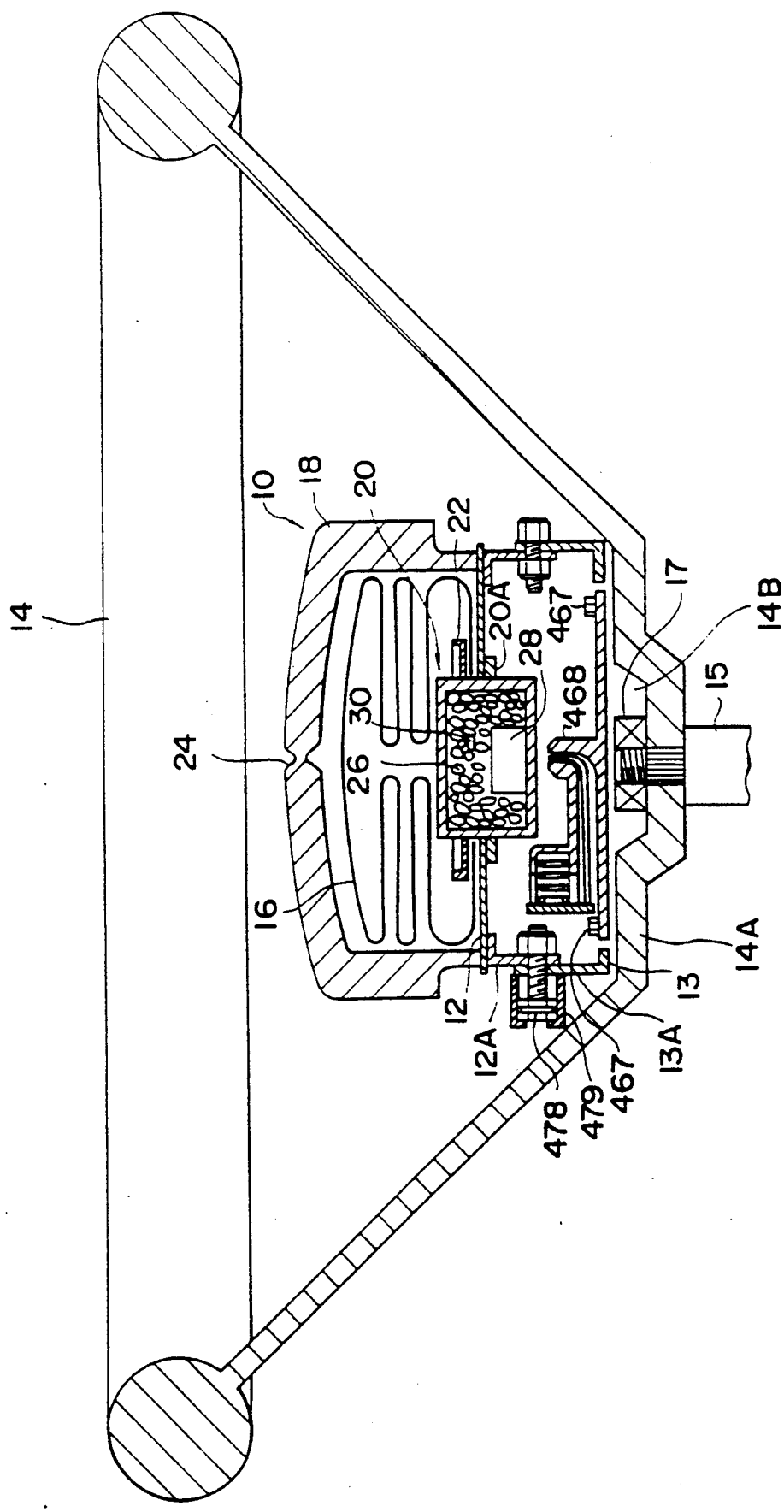
FIG. 21 is a cross-sectional view illustrating the whole construction of the fifth embodiment and corresponding to FIG. 7.

This support base 468 is arranged longitudinally in the radial direction of the steering wheel 14. And in the inner portion, a guide hole 469 is formed in the longitudinal direction. As intermediate portion of the guide hole 469 is bent substantially orthogonally, and one end thereof is arranged concentrically with the axis of the steering shaft 15 and abuts against the lock shaft 64. Accordingly, as shown in FIG. 20, this abutting portion is subjected to a downward pressing force by the compression coil spring 62 disposed in the trigger 28.

The distal end of the wire 466 led in the radial direction of the steering shaft 15 projects from the guide hole 469 and is welded to a pressing plate 470 so as to be secured. This pressing plate 470 is accommodated in a box 468B at an end portion of the support base 468 and is guided in such a manner as to be movable in the radial direction of the steering wheel 14. A compression coil spring 474 is provided in the box 468B so as to urge the wire 466 and the pressing plate 470 leftwardly as viewed in FIGS. 17 and 18, thereby maintaining the wire 466 in an unlocked state. In the state in FIG. 17 showing a condition that the pressing plate 470 is moved inside the box 468B to a maximum amount by the urging force of the compression coil spring 474, a distal end 466A of the wire 466 is at the same height as a top surface 468A of the support base 468.

The pressing plate 470 is adapted to be driven by a bolt 478 against the urging force of the compression coil spring 474. The bolt 478 is threadingly engaged with a nut 476. The nut 476 is welded to a leg plate 12A that is secured to the baseplate 12 by means of a bolt 471 and a nut 473. The leg plate 12A is inserted inside a vertically rising portion 13A extending from a part of the support base 468. The air bag body 10 is mounted on the steering wheel 14 via the leg plate 12A and the bolt 478 is made to pass through the vertically rising portion 13A and the leg plate 12A and threadingly engage with the nut 476. If this bolt 478 is further screwed in, the bolt 478 abuts against the pressing plate 470, thereby making it possible to move the pressing plate 470 against the urging force of the compression coil spring 474.

Figure 17:
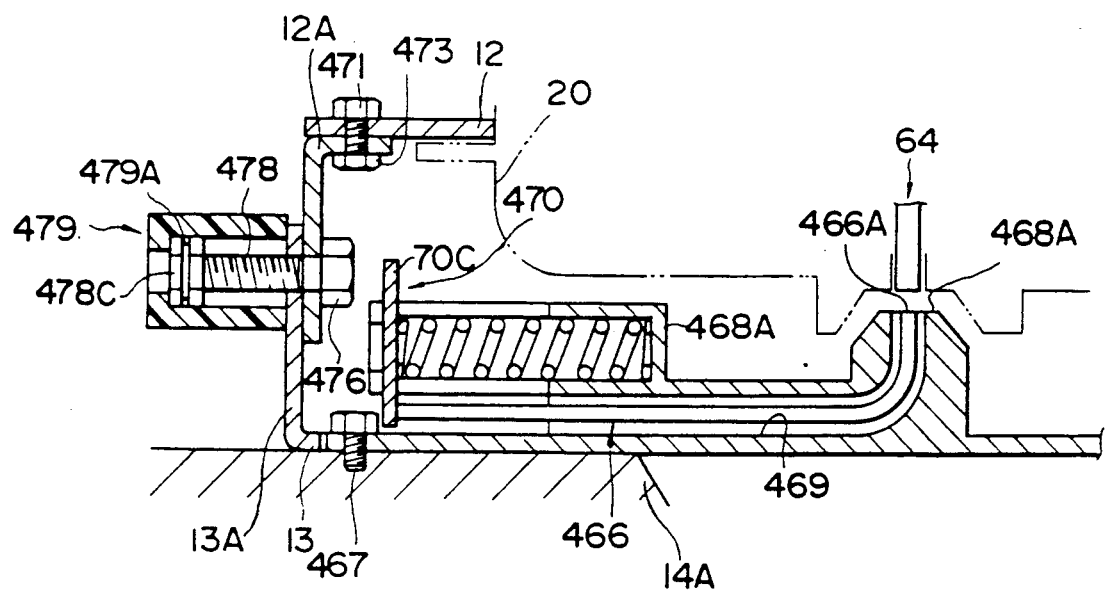
FIG. 17 is a cross-sectional view illustrating a fifth embodiment and corresponding to FIG. 6.

As shown in FIG. 17, a cap 479 is placed in advance on the head of the bolt 478 in a tentatively fixed state, so that the bolt 478 will not be rotated carelessly. The cap 479 has an ring projection 479A projecting inwardly from the inner periphery thereof, the ring projection 479A being fitted in an ring groove 478C provided at the head of the bolt 478.

Figure 18:
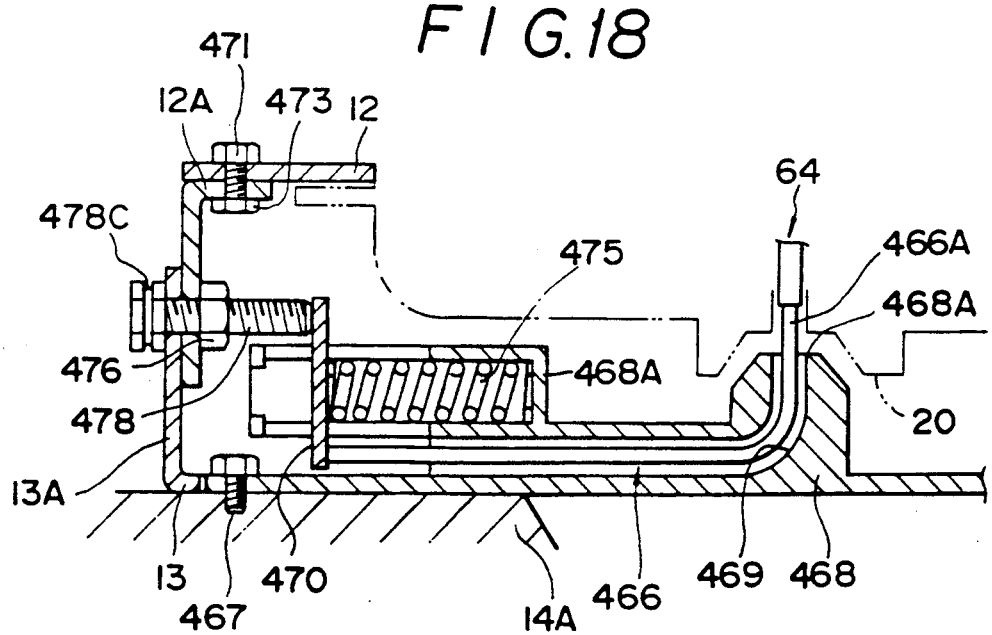
FIG. 18 is a diagram illustrating the state of operation of a principal part shown in FIG. 17.
Figure 19:
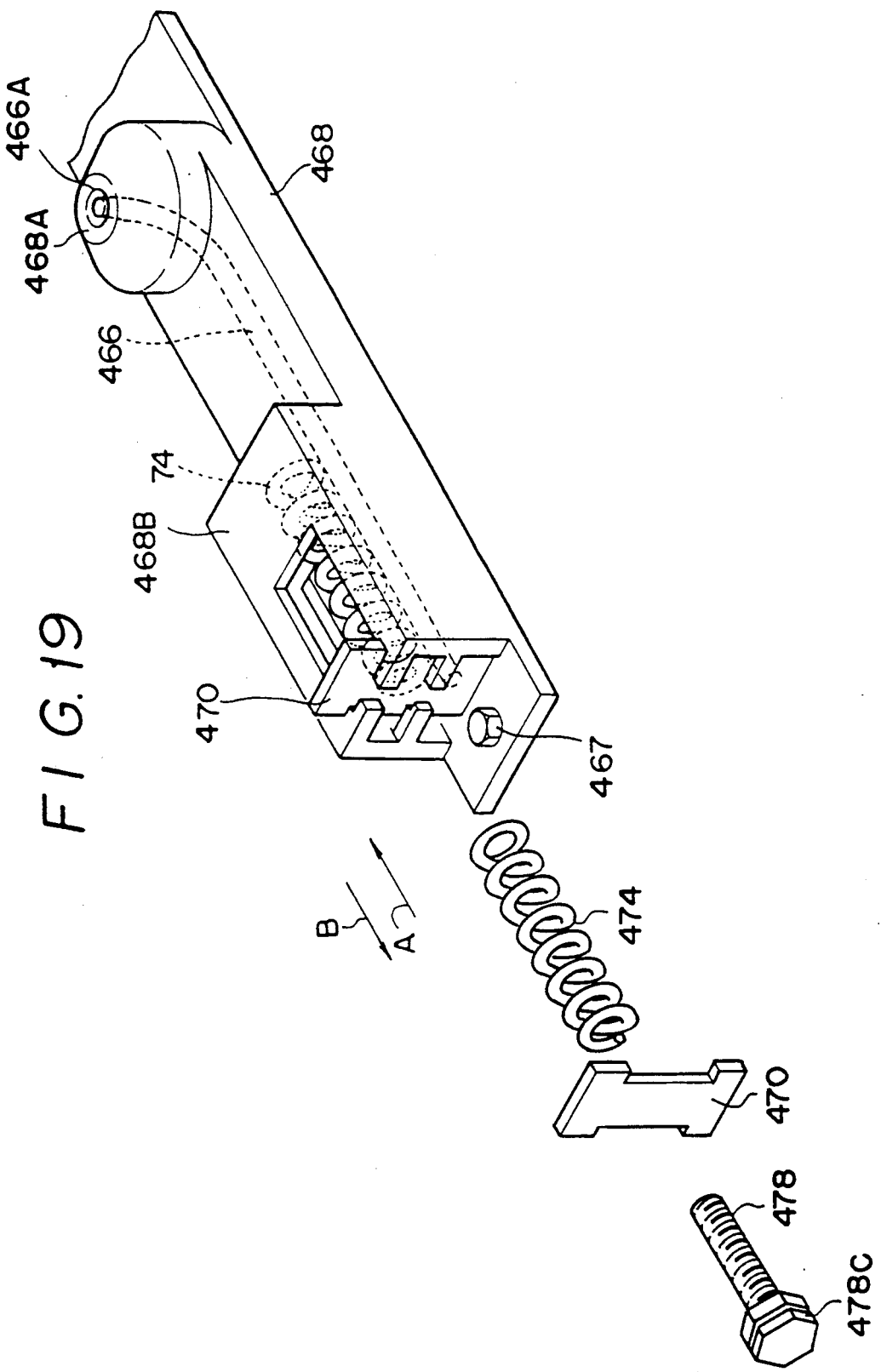
FIG. 19 is an exploded perspective view illustrating the principal part of FIG. 17.

In this embodiment thus arranged, at the time of mounting the air bag body 10, when the leg plate 12A is inserted inside the vertically rising portion 13A, as shown in FIG. 17, the operator removes the cap 479 and causes the bolt 478 to be threadingly engaged with the nut 476. In this state, since the distal end 466A does not press the lock shaft 64, the inflator 20 is in the locked state. If the bolt 478 is further screwed in, the bolt 478 moves the pressing plate 470 together with the wire 466 against the urging force of the compression coil spring 474. In consequence, the distal end 466A projects from the support base 468A and causes the lock shaft 64 to be raised, as shown in FIG. 18, so that the inflator 20 becomes unlocked and operable.

When demounting the air bag body 10, the reverse procedure of the above-described one is carried out. Specifically, if the bolt 478 is loosened, the inflator 20 is locked before the air bag body 10 is demounted, so that the inflator is prevented from being operated even if an impact is applied thereto during demounting.

FIG. 22 illustrates a sixth embodiment of the present invention. In this embodiment, the wire 466 of the preceding embodiment is accommodated in a guide pipe 502, which is supported to the base plate 12 via a bracket 504 and a bolt 506. One end of the wire 466 projecting from one end of the guide pipe 502 is inserted in a guide hole 510 of a guide block 508. The guide block 508 is fixed to the inflator 20, and the axis of the guide hole 510 is bent substantially orthogonally, and the distal end 466A corresponds to the lock shaft 64.

In addition, a ring 512 is secured to the distal end of the wire 466 projecting from the other end of the guide pipe 502, and a compression coil spring 514 is interposed between the ring 512 and the bracket 504 so as to urge the wire 466 away from the lock shaft 64. The ring 512 abuts against a pipe 516 secured to the outer periphery of the nut 476 so as to restrict the amount of movement.

In this embodiment, therefore, the wire 466, together with the inflator 20, is fixed to the air bag body 10 so as to reliably carry out the positioning of the distal end 466A of the wire 466A relative to the lock shaft 64. The operation of this embodiment is the same as that of the preceding embodiment. In addition, in this embodiment, even if the steering shaft 15 projects from the hub 14A in the direction of the air bag body 10, no hindrance is caused to the mounting of the air bag body 10.

What is claimed is:

1. An air bag apparatus for inflating an air bag of an air bag body when an acceleration exceeding a predetermined value has acted on said air bag body, comprising:
    mechanically movable locking means for preventing said air bag from being inflated when said acceleration on said air bag body exceeds said predetermined value;
    mounting means for mounting said air bag body on a chassis; and
    unlocking means having an actuating member which is pushed into said air bag body by an operation of an operator for releasing said locking means, and a stopper for preventing the movement of said actuating member in an opposite direction after being pushed in, for canceling the actuation of said locking means by an operation after the mounting of said air bag body on said chassis by said mounting means and permitting subsequently the inflation of said bag when said acceleration on said air bag body exceeds said predetermined value,
    whereby the inflation of said air bag is prevented prior to the mounting of said air bag body on said chassis and after the mounting of said air bag body on said chassis until said operation is performed.

2. An air bag device according to claim 1, further comprising a cam means provided on said actuating member, and said actuating member is arranged to impart an operating force in a pushing direction of said actuating member through said cam means to said unlocking means, said air bag body is mounted on a steering wheel, and said actuating member is operably pushed in the radial direction of said steering wheel.

3. An air apparatus according to claim 2, wherein said actuating member is mounted on said air bag body.

4. An air bag apparatus according to claim 1, further comprising a cam means provided on said actuating member, and said actuating member is operably moved in a longitudinal direction thereof, said actuating member is adapted to drive a release pin through said cam means, said release pin is adapted to unlock a lock of said locking means, said air bag is mounted on a steering wheel, and said actuating member is arranged in the longitudinal direction of said steering wheel.

5. An air bag apparatus according to claim 4, wherein said release pin is accommodated in a holder in such a manner as to be movable in an axial direction thereof, said holder is mounted in such a manner as to be movable in a radial direction of said steering wheel, and an engaging portion for engaging with said holder at the time of mounting on said steering wheel is provided in said air bag body, thereby permitting positioning between said holder and said steering wheel in the radial direction of said steering wheel.

6. An air bag apparatus according to claim 5, wherein said holder has a flange portion projecting in a radial direction from a part of a trunk for accommodating said release pin, said flange portion is clamped between the steering wheel and a support plate fixed to said steering wheel so as to be adjustable in the radial direction of said steering wheel, an opening for allowing said trunk to pass therethrough is formed in said support plate, and a gap is formed between said opening portion and an outer periphery of said holder so as to permit adjustment and movement of said holder.

7. An air bag apparatus according to claim 1, wherein said actuating member is capable of imparting to said unlocking means a moving force in a longitudinal direction applied by an operator so as to release a lock of said locking means, said actuating member being formed of a flexible material which is bent at a longitudinally intermediate portion thereof.

8. An air bag apparatus according to claim 7, wherein an end of said actuating member to which an operating force is applied by an operator is disposed in a radial direction of said steering wheel or in a tangential direction thereto.

9. An air bag apparatus according to claim 8, wherein said stopper includes pawls permitting longitudinally unidirectional movement of said flexible actuating member effected by the operator's operating force but preventing reverse movement thereof engaged with said flexible actuating member.

10. An air bag apparatus according to claim 7, wherein said end of said flexible actuating member located on the locking means side is disposed in the same direction as or parallel with the axial direction of said steering wheel.

11. An air bag apparatus having locking means for preventing a bag accommodated in an air bag body from inflating prior to mounting said air bag body which is mounted on a steering wheel, comprising:
an actuating member having one end disposed in the vicinity of an axis of a steering wheel and the other end disposed in the radial direction of said steering wheel, said other end being adapted to move longitudinally upon application thereto of an operating force exerted by an operator;
a release pin disposed in the axial direction of said steering wheel or parallel therewith and adapted to unlock said locking means through axial movement of said release pin and to set said air bag body in an operable state at the time when an acceleration has acted on said air bag body; and
conversion means for converting a longitudinally moving force of said actuating member into an axially moving force of said release pin whereby an operating force to said actuating member is imparted to said release pin via said converting means after mounting said air bag body on said steering wheel, thereby permitting the operation of said air bag body.

12. An air bag apparatus according to claim 11 wherein said conversion means is cam means interposed between said actuating member and said release pin.

13. An air bag apparatus according to claim 11, wherein said actuating member and said release pin are mounted on said steering wheel, positioning means being provided in such a manner as to effect an accurate positioning of said release pin relative to said locking means when said air bag body is mounted on said steering wheel.

14. An air bag apparatus according to claim 13, wherein said release pin is guided to a predetermined position by a guide groove provided in said air bag body.

15. An air bag apparatus according to claim 11, wherein said release pin is accommodated in a holder in such a manner as to be movable in an axial direction thereof, said holder is mounted in such a manner as to be movable in a radial direction of said steering wheel, and an engaging portion, provided in said air bag body, for engaging with said holder at the time of mounting on said steering wheel thereby permitting positioning between said holder and said steering wheel in the radial direction of said steering wheel.

16. An air bag apparatus according to claim 15, wherein said holder has a flange projecting radially from a part of a trunk for accommodating said release pin, said flange is clamped between steering wheel and a support plate fixed to said steering wheel so as to be adjustable in the radial direction of said steering wheel, an opening for allowing said trunk to pass therethrough being formed in said support plate, and a gap being formed between said opening and an outer periphery of said holder so as to permit adjustment and movement of said holder.

17. An air bag apparatus according to claim 11, wherein said actuating member comprises a threaded portion which is moved in the longitudinal direction thereof by a rotating operation.

18. An air bag apparatus for inflating a bag accommodated in an air bag body when an acceleration exceeding a predetermined value has acted on said air bag body, comprising:
locking means for preventing said bag from being inflated when said acceleration exceeding said predetermined value has acted on said air bag body;
mounting means for mounting said air bag body on a chassis; and
a flexible actuating member having one end corresponding to said locking means, a bent intermediate portion, and the other end led in a direction moving away from the axis of a steering wheel and serves an inputting portion for inputting an operating force of an operator, said locking means being unlocked by a longitudinally operating force exerted by the operator.

19. An air bag apparatus according to claim 18, further comprising a stopper for preventing reverse movement of said actuating member after cancellation of said operating force exerted on said actuating member.

20. An air bag apparatus according to claim 18, wherein said actuating member is provided with a threaded portion for moving in the axial direction by a rotating operation force exerted thereby by the operator.

21. An air bag apparatus according to claim 18, wherein an end of said actuating member to which an operating force is applied by the operator is disposed in a radial direction of said steering wheel or in a tangential direction thereto.

22. An air bag apparatus for inflating an air bag of an air bag body when an acceleration exceeding a predetermined value has acted on said air bag body, comprising:

mechanically movable locking means for preventing said air bag from being inflated when said acceleration on said air bag body exceeds said predetermined value;

mounting means for mounting said air bag body on a chassis;

unlocking means having an actuating member for releasing said locking means, and for canceling the actuation of said locking means by an operation after the mounting of said air bag body on said chassis by said mounting means and permitting subsequently the inflation of said bag when said acceleration on said air bag body exceeds said predetermined value; and a thread member provided on said actuating member having threads to enable said thread member to be screwed so as to push said actuating member for unlocking said locking means, whereby the inflation of said air bag is prevented prior to the mounting of said air bag body on said chassis and after the mounting of said air bag body on said chassis until said operation is performed.

* * * * *